Sept. 15, 1959
N. V. BEAMAN
2,903,998
PAN GREASING MACHINE
Filed Nov. 16, 1955
11 Sheets-Sheet 8
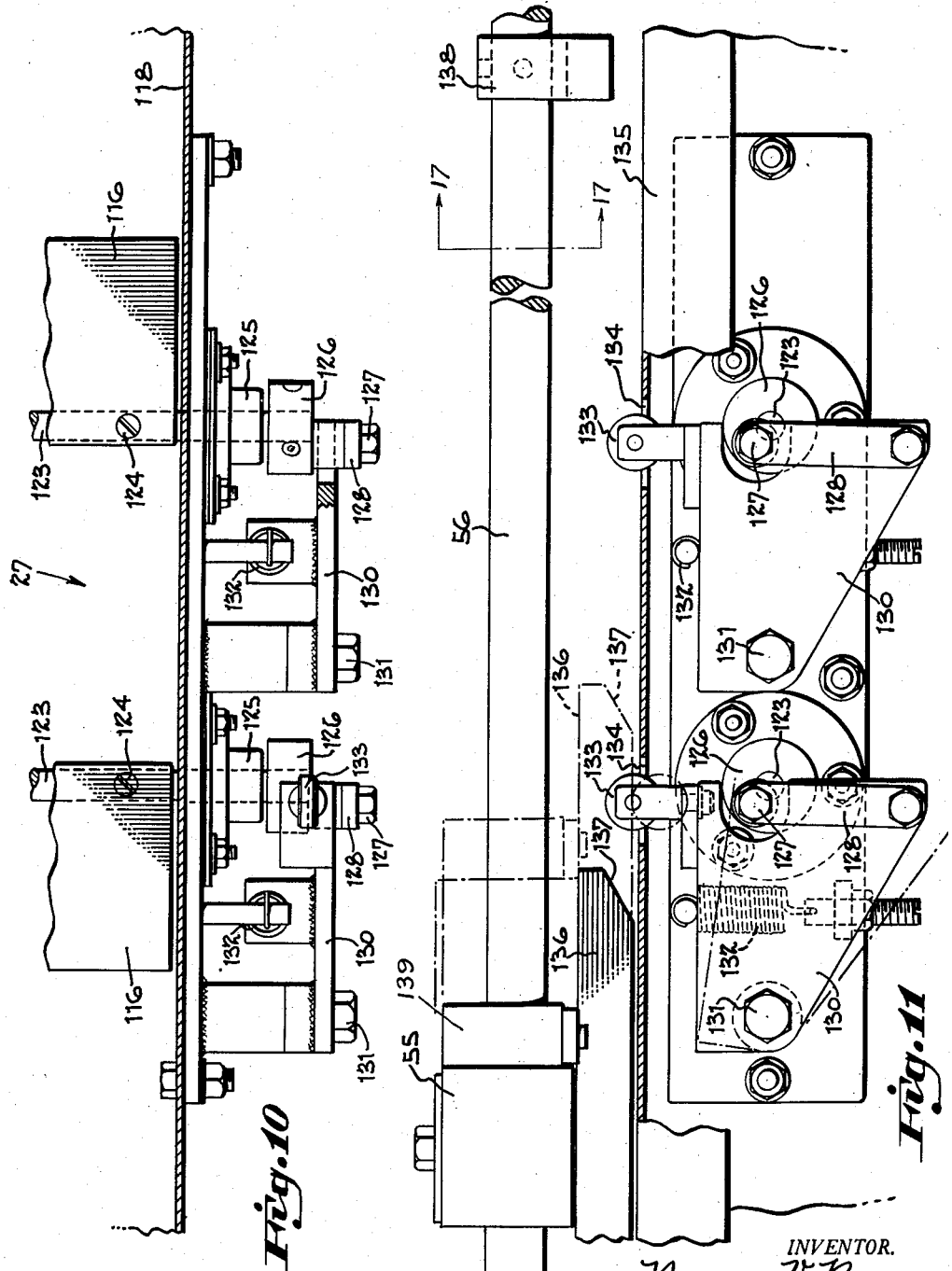
INVENTOR.
Norman V. Beaman.
BY
Wood, Herron & Evans.
ATTORNEYS.

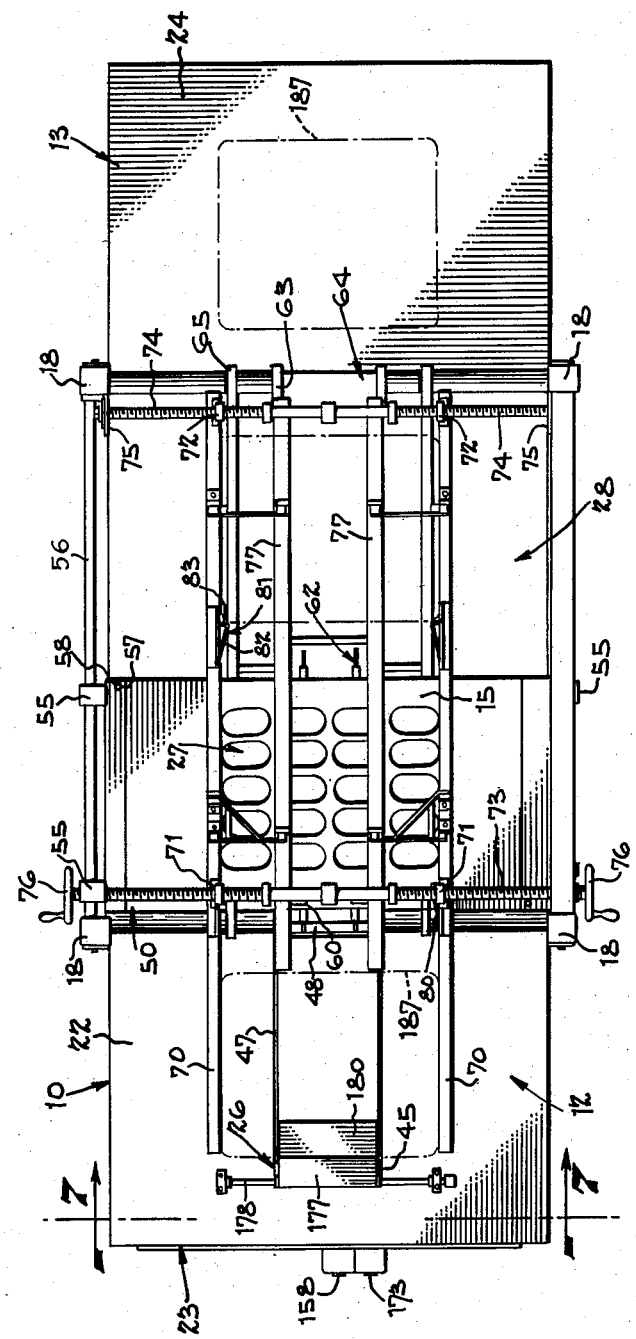

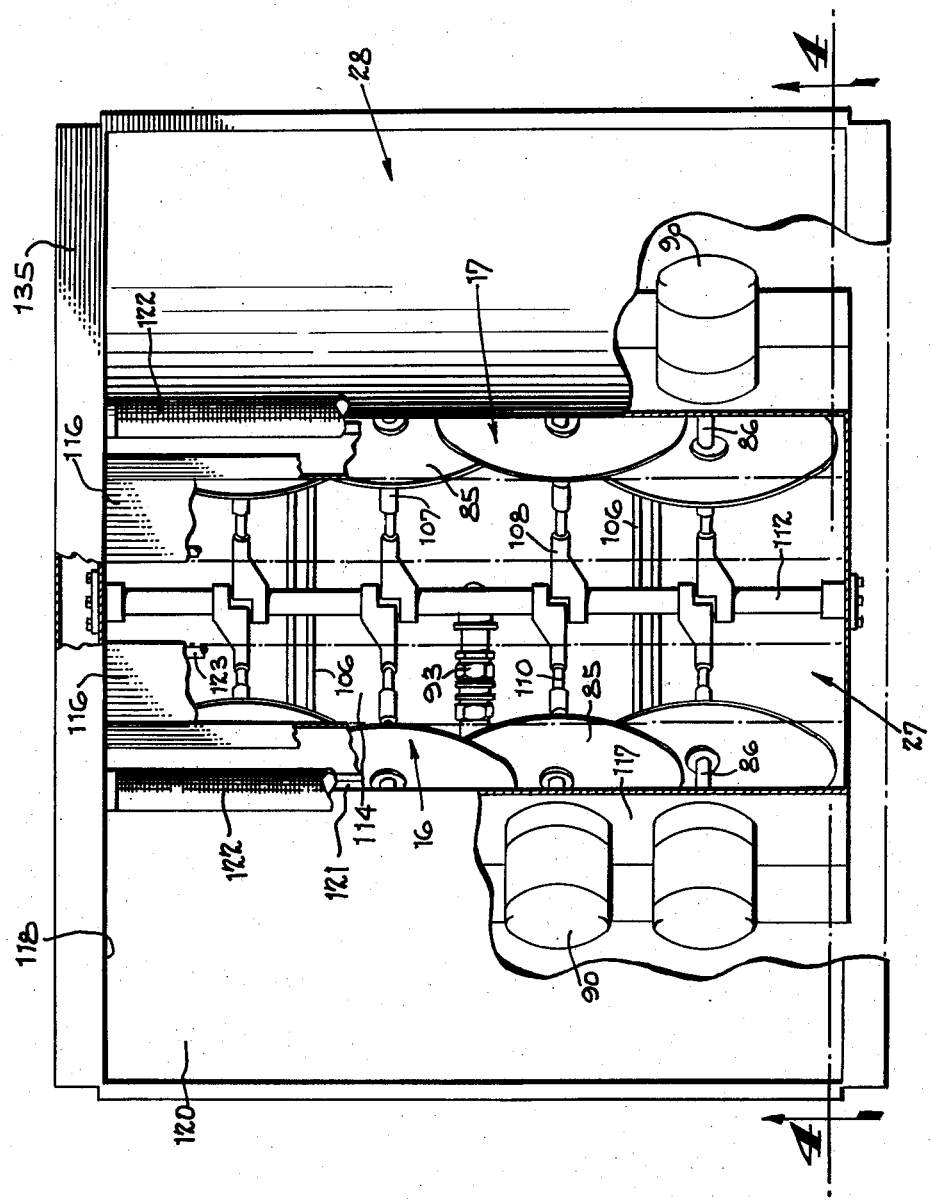

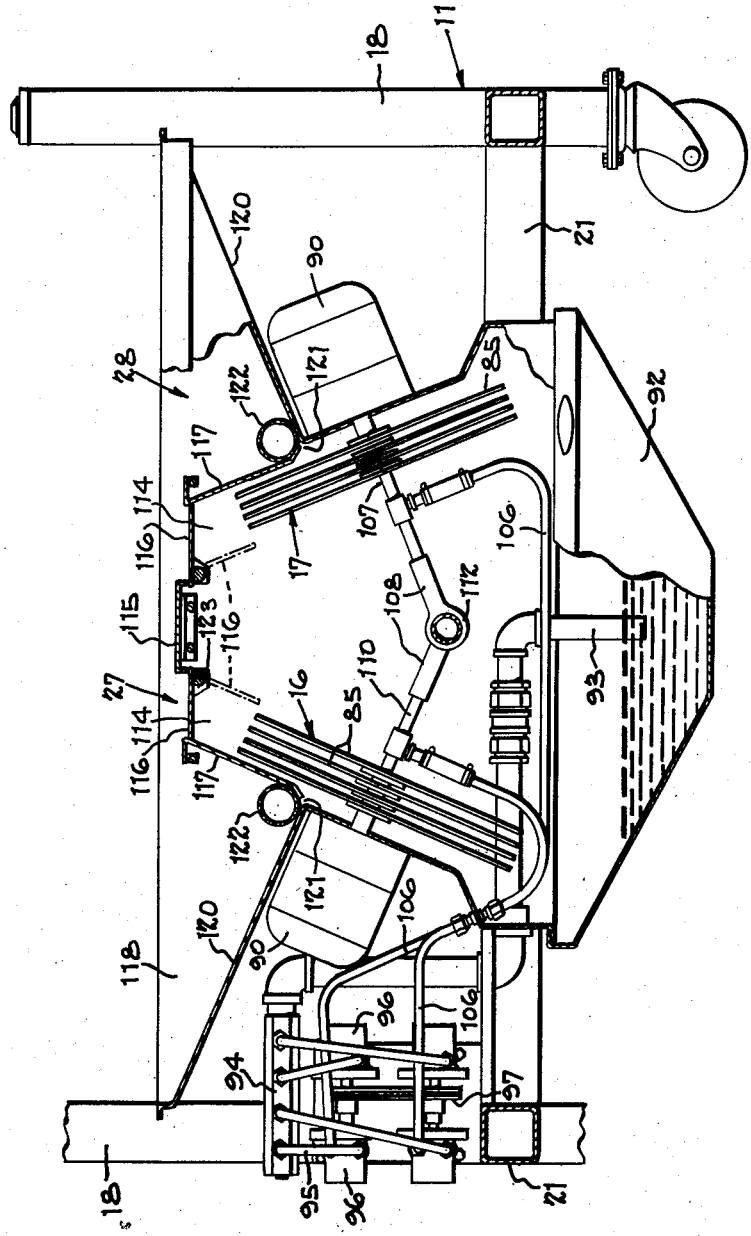

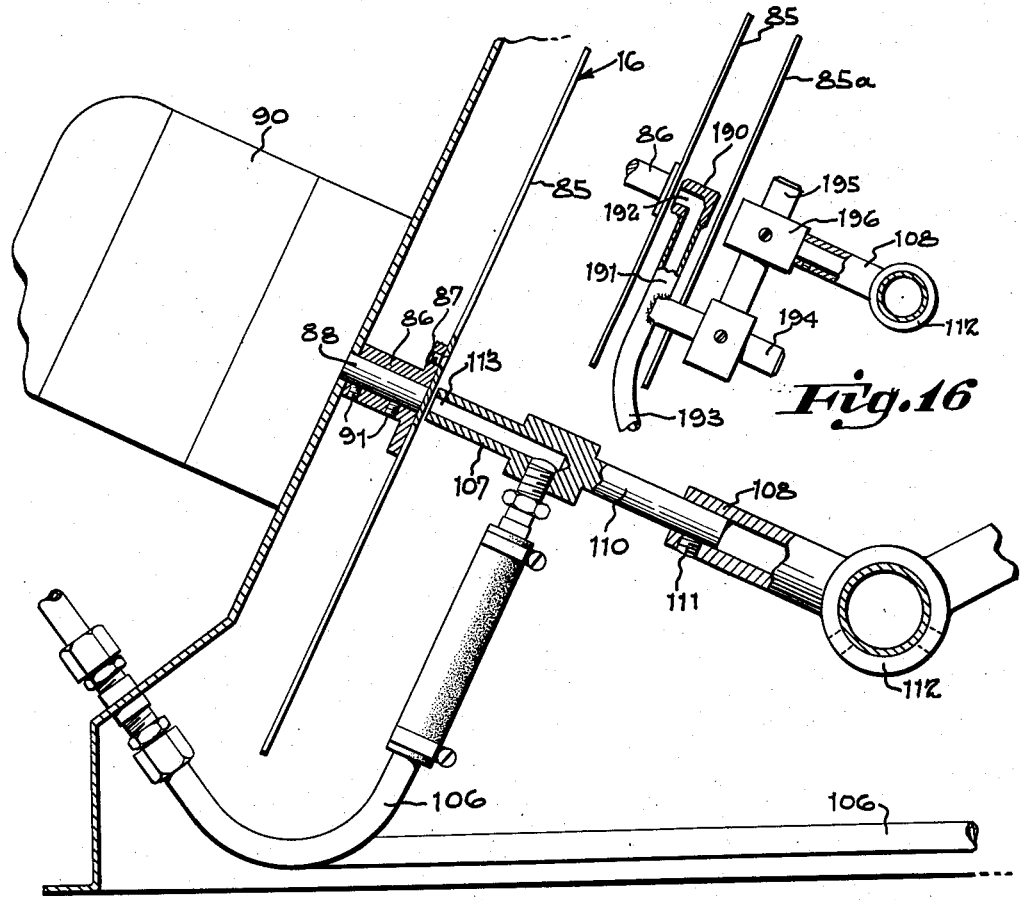
Fig. 16
Fig. 5
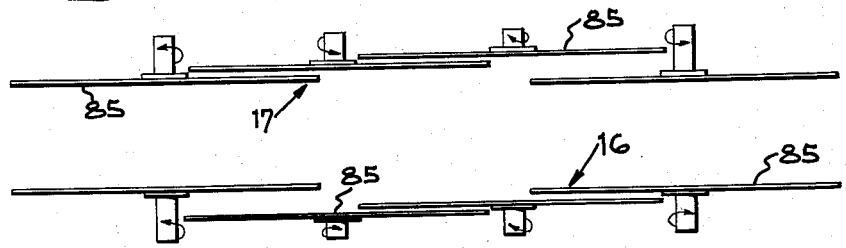
Fig. 6
INVENTOR.
Norman V. Beaman.
BY Wood, Herron & Evans.
ATTORNEYS.

Sept. 15, 1959 N. V. BEAMAN 2,903,998
PAN GREASING MACHINE
Filed Nov. 16, 1955 11 Sheets-Sheet 10

INVENTOR.
Norman V. Beaman.
BY Wood, Herron & Evans.
ATTORNEYS.

Sept. 15, 1959 N. V. BEAMAN 2,903,998
PAN GREASING MACHINE
Filed Nov. 16, 1955 11 Sheets-Sheet 11

INVENTOR.
Norman V. Beaman.
BY
Wood, Herron & Evans.
ATTORNEYS.

United States Patent Office 2,903,998
Patented Sept. 15, 1959

2,903,998

PAN GREASING MACHINE

Norman V. Beaman, Cheviot, Ohio, assignor to The J. H. Day Company, Inc., Norwood, Ohio, a corporation of Ohio Application November 16, 1955, Serial No. 547,149

11 Claims. (Cl. 118—301)

This invention relates to pan greasing machines of the type used in bakeries for greasing baking pans and the like and is primarily directed to a pan greasing machine in which grease is sprayed on to the pans from rapidly spraying discs.

In bakeries it is conventional practice to bake cakes and other forms of sweet goods in cake pans of multiple cavity forms. That is, in general a number of pans, for example, twenty-four, and joined together to form a large single unit having a number of dough receiving receptacles, or cavities. Before dough pieces are inserted into these cavities, it is necessary that the cavities be coated with a grease to prevent adherence of dough to the pan during the baking process. Many different forms of grease are employed, such as beeswax, mineral oil, vegetable oil and the like; and in general these greases are quite viscous.

In the past much effort has been expended in attempts to provide a pan greasing machine which will evenly coat the entire inner surface of each baking cavity with a uniform coating of grease and which will be trouble free in operation. These pan greasing machines have utilized various forms of pressure spraying apparatus of the spray gun, or atomizing nozzle type. However, because of the viscous nature of the grease employed and the tendency of foreign particles such as crumbs and the like to become lodged in the small apertures required in the atomizing nozzles, these machines are all subject to the serious defect that they frequently become clogged, requiring the entire production line to be shut down while the nozzle is disassembled and cleaned.

Another difficulty of previously available greasing machines is that they have not been effective to apply a thorough and uniform coating of grease to all of the pan cavities. One defect is that there are concentrated deposits of grease due to improper atomization. Moreover, rather a large proportion of the grease applied to each cavity is deposited on the bottom of the cavity. Consequently, if an adequate coating is applied to the side walls the coating on the bottom of the pan is of necessity much thicker than is required. This not only is wasteful of grease but also has a deleterious effect on the baked goods, causing them to become soggy. On the other hand, if a coating of proper thickness is applied to the bottom of the pan, the sides are insufficiently coated causing the baked goods to burn and stick to the pan.

The present invention is predicated upon the concept of providing a pan greasing machine in which grease is applied to the pans from a plurality of flinging elements such as rapidly rotating discs. In the present machine there are no small grease apertures or small air pressure openings. Rather, grease is pumped through a plurality of large diameter tubes to the center of the rotating disc faces, which function to atomize the grease and project it in a curtain into the baking pan cavities.

More particularly, a preferred form of pan greasing machine constructed in accordance with the present invention comprises an elongated frame having a loading table formed on one end thereof and a discharge table formed on the opposite end. Intermediate these two stations the machine is provided with a greasing station and a draining station. Means are provided for advancing the pans in an inverted position, that is, with the cavities thereof facing downwardly, in a step by step movement from station to station through the machine. Thus during the process of being greased, a pan is advanced in one cycle of operation from the loading table to the greasing station. In succeeding cycles the pan is advanced across the greasing station to the draining station and subsequently from the draining station to the discharge table. In practice, these three operations are being carried on simultaneously during each cycle of operation so that as one set of pans is advancing from the loading station to the greasing station, a second set of pans is passing over the greasing station to the template draining station, and a third set of pans is being shifted from the draining station to the discharge table.

The top of the greasing station is provided with a template having a plurality of openings therein conforming in size and shape to the open ends of the pan cavities. A strap of pans is carried over the greasing station on top of the template, the pan cavities being in registry with the template openings. The rotating discs project grease upwardly through the template openings and into the pan cavities while the template shields the remaining portions of the pans from the grease spray.

While rotating discs provide many advantages over spray nozzles they also present problems not involved in machines using spray nozzles. Specifically, it is not feasible to stop and start a rotating disc between the greasing of successive pans, so that it is desirable to provide means for preventing the grease spray created by the discs from entering the room when the template and pans do not confine it. Consequently, one of the principal objects of this invention is to provide a centrifugal pan greasing machine having continuously rotating spraying discs and means for preventing grease from escaping from the machine when no pan is in position to be sprayed.

As explained in detail below, these means generally comprise flaps positioned over the flinging elements and a cam mechanism adapted to rotate the flaps to an open position when the template and a strap of pans are positioned over the flaps in the path of the grease spray. This same cam mechanism is effective to prevent actuation of the flaps on the return stroke of the template after the pans have been deposited at the draining station, and on the forward stroke of the template when no pan is disposed over the template.

Another principal object of the present invention is to provide a centrifugal coating construction effective to apply an even coating to the sides and bottoms of cake pans of any configuration. In the present machine, the centrifugal coating means are constituted by two sets of rotating discs; the discs of each set slightly overlap one another and are mounted for rotation in planes slightly spaced apart. The two sets of discs are angulated with respect to one another, the upper ends of each set of discs being tilted toward the discs of the opposite set.

Thus each set of discs is adapted to project a curtain of grease into the pan cavities. One set of discs is particularly effective to coat the rear walls of the cavities, while the other set of discs is effective to coat the front walls of the cavities. It has been determined in tests conducted in bakeries that the present machine is effective to provide a substantially uniform protective coating on the pans using as little as one third the amount of grease consumed by spray atomization type machines. This highly advantageous result is due to the angulation of the discs which facilitates coating of the side, front and rear walls of the cavities as well as the bottom.

Another of the advantages of the present machine is that the pan advancing mechanism is extremely simple and is trouble free in operation. More particularly in the preferred embodiment pans are shifted through the machine by means of three sets of upwardly extending pivotally mounted pan fingers. These pan fingers located at the loading station, greasing station and draining station are reciprocated in unison by means of a chain and driving fork linkage. In addition to these fingers, the pan shifting mechanism includes two sets of spring loaded stops. One set is disposed intermediate the loading station and greasing station; while the second set of stops is disposed between the greasing station and draining station.

During one cycle of operation of the pan advancing mechanism, a separate set of pans is engaged by each of the three sets of fingers. One set of fingers shifts a pan from the loading station through the first set of stops at the forward end of the greasing station, while the second set of fingers shifts another set of pans through the second set of stops at the forward end of the draining station. Simultaneously, a third set of fingers shifts the pans from the draining station onto the unloading table. On the return motion of the fingers, the pans are prevented from reverse movement by the stops as the next set of fingers passes beneath the pans to a point where they are disposed in position behind the pans to spring upwardly and to engage the pans on their next forward movement.

The template is linked to these sets of fingers so that it moves in unison with them. In the preferred embodiment, the center set of pan advancing fingers project upwardly through suitable openings in the template and perform a double function in that they not only advance pans through the greasing station but also align the pan cavities with the template openings.

In addition to its simplicity, the present pan advancing mechanism is extremely advantageous in that it minimizes the amount of grease which accumulates on the unloading table. Neither the template nor any form of conveyor belt move over the unloading table so that no grease is transferred directly from the greasing station to the discharge area of the machine.

A further advantage of the present pan advancing mechanism is that it is effective to prevent pans from becoming jammed in the machine or from passing through the machine in an improper manner so that the pans are only partially greased or that portions of the pan receive a double coating of grease. More particularly, the present pan shifting mechanism includes a control circuit for the main drive motor which is effective to deenergize the motor while the pan advancing mechanism is still in its return movement if no pan is placed on the loading table immediately prior to the time the pan advancing mechanism is ready to resume its forward motion.

It is the usual practice in bakeries for an attendant to load pans on the machine from a movable rack or the like. Occasionally the attendant must leave the greasing machine to obtain a new rack of pans, or for some other reason. If the pan advancing mechanism is moving in a forward direction when the operator stops the machine before leaving it, and thereafter a pan is placed at the loading station, the first set of the pan advancing fingers are apt to catch one of the walls in the center of a strap of pans so that the pans are advanced only a part of the way through the stops at the greasing station; and consequently are not positioned correctly relative to the template to receive the grease sprays.

As explained in greater detail below, in the present machine the pan advancing mechanism is automatically stopped in a predetermined position if no pan is at the loading station by means of a circuit including a cycling switch adapted to be closed by a strap of pans at the loading station, and a conveyor positioning switch which is normally closed but is momentarily opened as the pan advancing mechanism nears the end of its return stroke. These switches are placed in circuit connection so that the main motor is deenergized if both switches are open at the same time, but remains energized if one of the switches is closed.

These and other objects and advantages of the present invention will be more readily apparent from a further consideration of the following detailed description of the drawings illustrating a preferred embodiment of the invention.

In the drawings:

Figure 2 is a top plan view of the greasing machine showing the pan hold down strips.

Figure 3 is a top plan view of the greasing station, a portion of the pan-supporting platform being broken away to show details of construction.

Figure 4 is a cross sectional view taken along line 4—4 of Figure 3.

Figure 5 is an elevational view of a rotating disc and grease nozzle, the grease nozzle being shown partly in section.

Figure 6 is a diagrammatic top view of the rotating discs.

Figure 10 is a top plan view of the flap actuating mechanism.

Figure 11 is a side view of the flap actuating mechanism shown in Figure 10.

Figure 16 is a side view similar to Figure 5 of a modified grease nozzle.

Figures 14, 15:
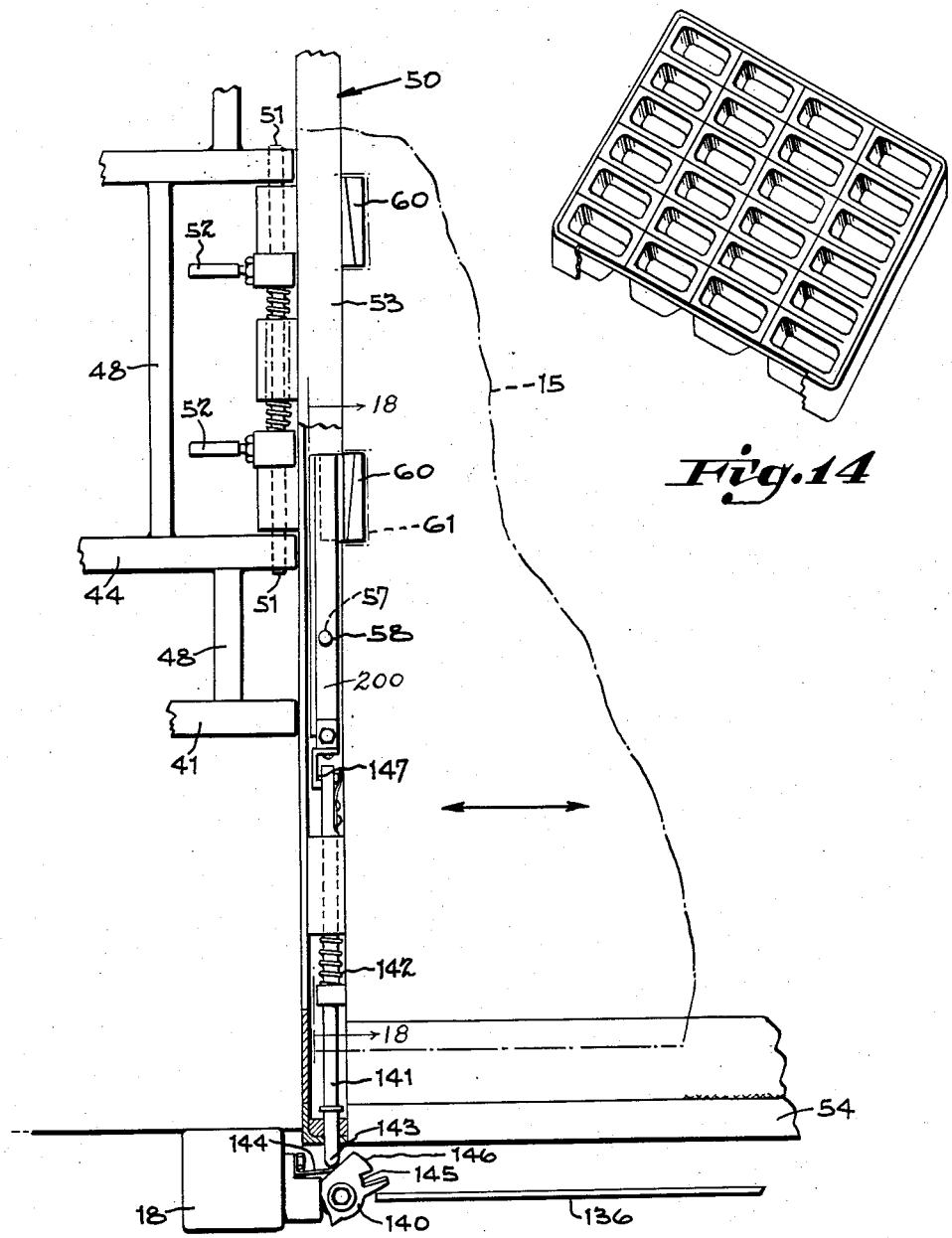
Figure 14 is a perspective view of a typical strap of pans.
Figure 15 is a partial top plan view of the template frame and flap actuating cam.

A pan greasing machine 10 constructed in accordance with the present invention comprises a frame 11 which carries a pan loading table 12, a pan unloading table 13, a main drive motor 14, and a pan shifting mechanism driven from the motor for automatically advancing inverted straps of pans through the machine. As explained below, the pan shifting mechanism includes a template 15, mounted for reciprocating movement over a greasing station disposed centrally of the machine. Two sets of flinging elements, 16 and 17, in the form of rotating discs, are disposed beneath the upper surface of the machine at the greasing station and are adapted to project grease upwardly through the template into the cavities of a plurality of baking pans joined together to form a "strap" of pans as best shown in Figure 14.

More particularly frame 11 is formed of angle irons and other suitable structural frame members, including legs 18 and upper and lower longitudinal members 20 and 21. The pan supporting surface at the forward end of the machine, or loading table 12, is covered by a top panel 22. This panel is of generally rectangular configuration and extends from the forward end 23 of the machine approximately one third the length of the machine.

The pan supporting surface at the discharge end of the machine, or unloading table 13, also includes a generally rectangular top panel 24 extending from the discharge end of the machine forwardly toward the greasing station and loading table. The unloading table covers a rack 25 adapted to support additional templates 15 during periods of storage.

A pan shifting mechanism generally designated 26, is provided for shifting pans placed on the loading table 12 in a step by step movement over greasing station 27, and draining station 28 to the unloading table 13. As explained in greater detail below, this mechanism is also effective to shift template 15 in unison with the pans across greasing station 27 so that the rims and other areas of the pans are shielded, and grease is applied only to the pan cavities.

Pan shifting mechanism 26 is driven from main motor 14. This motor is effective to drive two longitudinally extending chains 30 through a drive including a variable pitch pulley 29, belt 31, pulley 32, speed reduction unit 33 and chains 34. These chains pass over sprockets 35 which in turn are connected to drive sprockets carrying longitudinal chains 30, the drive sprockets (not shown) are disposed beneath the inner edge of the pan loading table.

Longitudinally extending chains 30 pass from the drive sprockets forwardly beneath the top of the machine to idler sprockets 36 disposed adjacent to the forward end 23 of the machine. Each of the chains carries a chain block 37 which is bolted or otherwise secured to the chain for movement therewith; and is provided with a groove adapted to slidably engage a vertical slot 38 in driving fork 39. This fork is bolted, or otherwise secured, to a transverse bar 40 including end flanges 41 resting on nylon runners 42 carried by longitudinal channel shaped frame members 43. Transverse bar 40 also carries two longitudinal angle strips 44. These strips lie just below panel 22 and in turn carry pan advancing fingers 45 which are pivotally secured to the angle members as at 46 and are spring urged upwardly through longitudinal slots 47 in top panel 22. Slots 47 are disposed centrally of the table and are spaced apart a distance less than the width of a strap of pans.

The inner end of angle members 44 are adapted for releasable engagement with template carrying frame 50 by means of slideable pins 51. These pins are spring urged outwardly into engagement with apertures provided in angle irons 44 but can be retracted to disengage the irons and frame by pressing operating handles 52 inwardly. Suitable cross members 48 rigidify the inner ends of angle members 44 and 41.

Template carrying frame 50 is generally rectangular in shape and includes two transverse end members 53 and two longitudinal side members 54. The frame is mounted for reciprocating motion over the greasing and draining stations 27 and 28 by means of four bearing blocks 55, two of which are secured to each of the side strips 54 and slidably engage guide bars 56 carried between legs 18 of the frame. A template 15, formed of sheet metal and provided with a plurality of spaced apertures conforming in size and shape to the pan openings is mounted over the open central portion of template frame 50. Template 15 is provided with two openings 57 adjacent diametrically opposite points on the template, which openings are adapted to receive pins 58 carried by the side members 54 of frame 50, upon which the template rests. Template frame 50 also carries two pivotally mounted pan advancing lugs 60 which are spring urged upwardly through suitable apertures 61 provided in template 15.

The discharge end of template frame 50 is provided with a spring urged pin assembly 62, identical with that including pins 51, previously described. This assembly is adapted for engagement with angle members 63 of pan discharge unit 64. This unit in addition to longitudinal angle members 63 includes outer longitudinal members 65 and a transverse bar (not shown) which is identical with transverse bar 40 and includes flanges adapted to engage nylon runners carried by longitudinal channel frame members (not shown). This assembly is rigidified by suitable cross members 66, and in addition includes pan fingers 67 pivotally secured to longitudinal angle members 63 in the same manner that pan fingers 45 are secured to angle members 44.

It will be understood that when the template frame is secured to angle members 44 of the pan advancing unit 26 at the loading station and to channel member 63 of pan discharge unit 64, all three units are reciprocated in unison as chains 30 are driven by motor 14. However when it is desired to thoroughly clean the machine the template shifting frame can be removed by disengaging it from channel irons 44 and 64. Also template 15 can be replaced with one adapted to accommodate pans of a different shape by lifting the old template free from pins 58 and slipping the new template in place.

Figure 1:
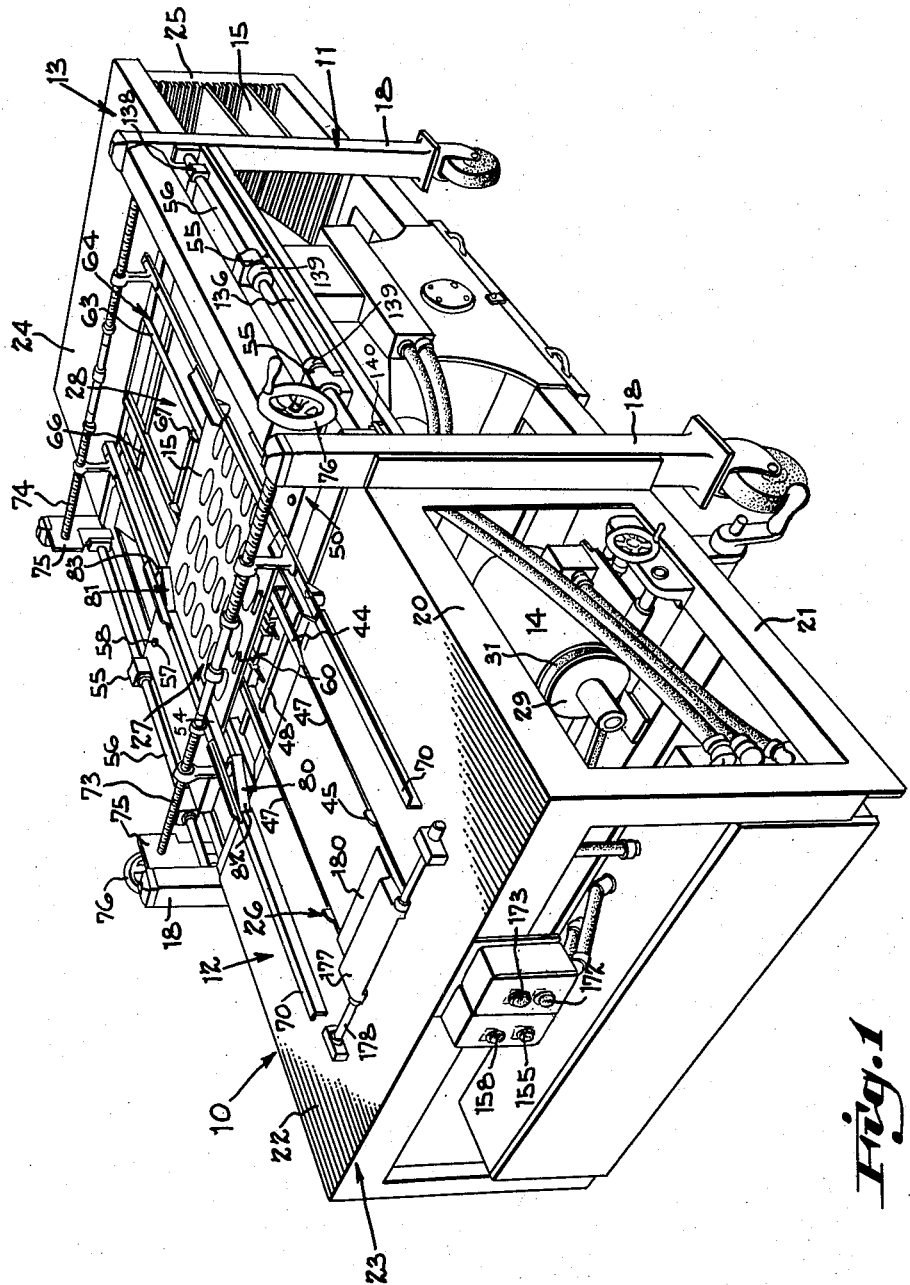
Figure 1 is a perspective view of a pan greasing machine constructed in accordance with the present invention.
Figure 7:
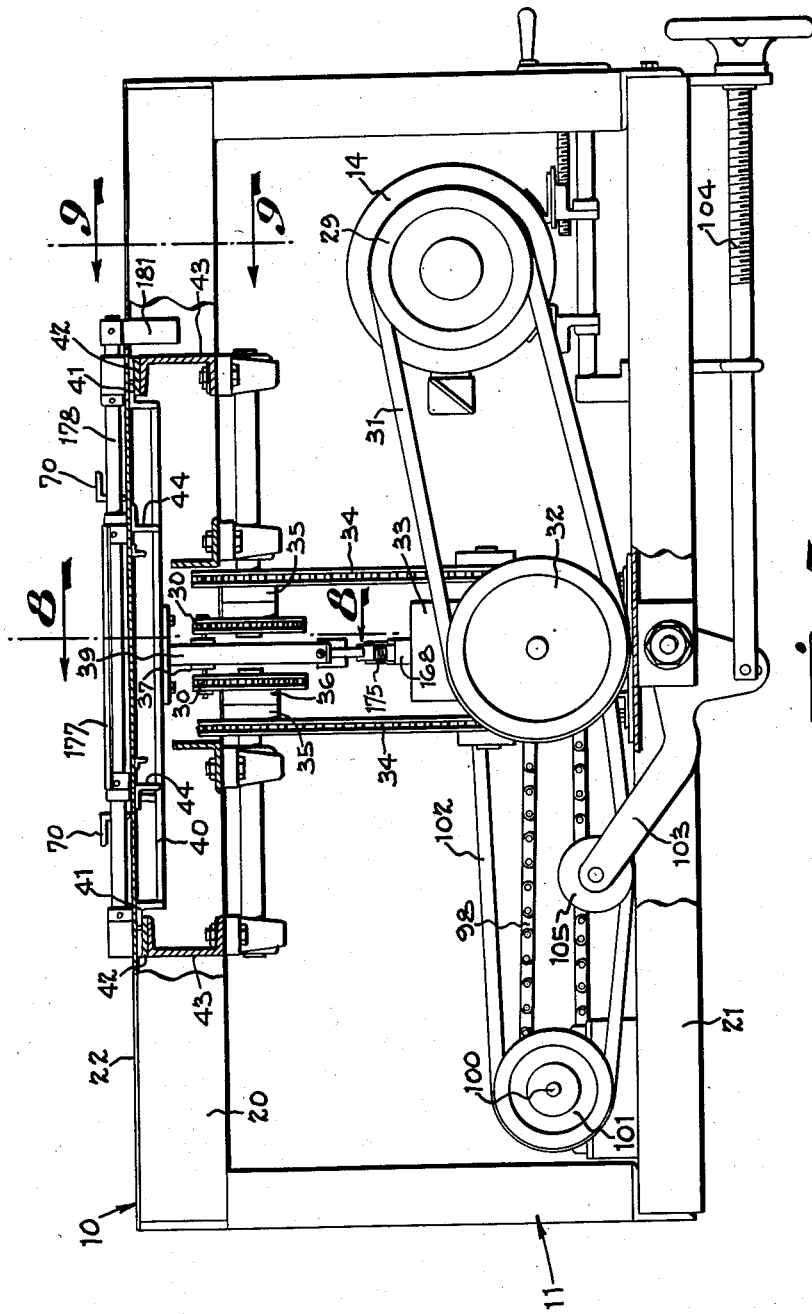
Figure 7 is a cross sectional view taken along line 7—7 of Figure 2.

The straps of pans, which are placed in an inverted position on the loading table 12 are guided in their passage through the machine by side guide members 70. These guide members are suspended from brackets 71 and 72, respectively carried by cross rods 73 and 74. The cross rods, which threadably engage the brackets are rotatably journaled in end plates 75—75 and brackets carried by the machine frame. Hand wheels 76 are secured to the ends of rod 73 for turning the rod and adjusting the space in between guide members 70. A conventional chain drive interconnects rods 73 and 74 so that both the ends of the guide members are moved out in unison. In addition to guide members 70, the top hold-down straps 77 are mounted over the greasing and draining stations 27 and 28 of the machine for engagement with the pan tops for holding the straps of pans firmly against the template. Side guide members 70 also carries two sets of stops 80 and 81. These stops are pivotally mounted angular members having a leading edge 82 forming an acute angle with the guide strips and a rear edge 83 extending perpendicular to the guide strips. The stop members are spring urged inwardly to the positions shown in Figures 1 and 2 but are pivotally mounted for outward movement to permit the passage of pans between the stops. When the pans pass thorugh the stops, the stops automatically spring inwardly and their rear edges are effective to prevent the passage of pans in the reverse direction.

The pan spraying mechanism is best shown in Figures 3 through 6 and 12. As there shown grease is applied to the pans from a plurality of rotating flinging elements, in the preferred embodiment constituted by flat rotating discs 85. These discs are mounted in two groups designated 16 and 17. The discs of each group are disposed parallel with one another and are slightly angulated from the vertical, the upper ends of the discs extending inwardly toward the opposite discs. The discs of each group overlap one another, the planes of rotation of the discs being slightly spaced apart. Alternate discs in each set rotate in opposite directions, the outermost edges of the end discs moving in a generally downward direction. As best shown in Figure 5, each of the discs carries a centrally disposed boss 86 which is secured to the disc in any suitable manner as by means of screws 87 and is mounted upon shaft 88 of a disc rotating motor 90 by means of set screws 91. Each disc is provided with its own associated motor, the motors being mounted on the machine frame in any suitable manner.

Any desired type of grease is supplied to the discs through a grease supply system comprising a sump 92 disposed at the bottom of the machine beneath the discs. Grease is withdrawn from the sump through a suction tube 93 which communicates with a manifold 94. Eight inlet tubes 95 connect the manifold to eight positive displacement pumps 96; these pumps are driven from main motor 14 through a drive including chain 97. This chain passes over a sprocket (not shown), mechanically connected to a sprockets turned by chain 98. Chain 98 is in turn driven from a sprocket mounted on shaft 100, the opposite end of the shaft carrying pulley 101 which engages belt 102. Belt 102 also passes over a pulley mounted on an output shaft of speed reduction unit 33. A conventional tightening arrangement is provided for this belt; the tightener includes an arm 103 secured to adjustment rod 104 and carrying pulley 105 in an engagement with the belt 102.

Grease is conducted from each of the pumps through a separate tube 106 to a nozzle 107 disposed adjacent to the center of the inner face of one of the rotating discs. Grease nozzle 107 adjustably secured in place by means of a mounting arm assembly including a tubular arm 108 adapted to receive a rodlike portion 110 of the nozzle, the rodlike portion being slidable within the arm and being held by means of set screws 111. Army 108 is rotatably and slideably mounted on a transverse rod 112 and is fixed in its desired position by means of suitable set screws (not shown). By sliding and rotating arms 108 and slideably adjusting nozzle 107 relative to arms 108 each nozzle may be in position so that its grease discharge opening 113 is disposed opposite the center of its associated disc. This grease supply system is shown diagrammatically in Figures 12 and 16.

The flinging elements 85 are adapted to project grease upwardly through openings 114 provided at the ends of central cover plate 115. These openings are adapted to be closed by flaps 116 when no pans are disposed above the openings so that grease is not sprayed into the room. However, when pans are positioned at the greasing station, over the openings, flaps 116 are rotated downwardly to an open position shown in dotted lines in Figure 4. Grease flows from nozzles 107 against the discs from which it is thrown off in minute droplets and passes through the template openings, evenly covering the bottom and side walls of the inverted pans which are carried over the template. It will be appreciated that the angulation of discs 17 adapts these discs to coat the rear ends of the pan openings, while discs 16 are similarly effective to coat the front walls of the pans. Since the grease is projected tangentially from the discs in a curtain, or sheet the side walls of the pans are also evenly coated. However, it will be noted that the two sheets are not convergent at the pan bottoms so that any interference which might cause uneven distribution of grease on portions of the pan is eliminated.

Grease is confined to passage through openings 114 by angulated walls 117 disposed adjacent to the flaps and main housing walls 118 which enclose the discs from the motors, pumps and other equipment and provide elongated drain extensions 120 at either end of the openings 114. Walls 117 are slightly separated from walls 118 as at 121 to allow grease to be returned from the trough, formed by walls 120, to sump 92. Tubular screen members 122 are placed across grease openings 121 to prevent crumbs and other solid particles from entering the sump.

Flaps 116 are adapted to be opened only when template 15 and a strap of pans are disposed above the flap openings. The means provided for actuating the flaps are best shown in Figures 10, 11 and 15. As there shown, generally rectangular flaps 116 are secured to shafts 123 as by means of bolts 124. The ends of these shafts are journalled in bearing blocks 125, mounted on the side frame members of the machine. The end of each shaft 123 carries a disc 126 which is fixed to the shaft and is provided with a pin 127 eccentric with shaft 123 and connected to link 128 of pivotally mounted actuating bracket 130. This bracket is supported by pin 131 and is spring urged upwardly by spring 132, the spring being secured to the bracket and to a frame member. Follower 133 is secured to the upper edge of the bracket and is adapted to project upwardly through an opening 134 in side frame member 135. In its upward position the follower is adapted for engagement with a cam bar 136 mounted for movement with template frame 50. Cam bar 136 is carried by two spaced sleeves 139 slidably and rotatably mounted upon guide bars 56 intermediate bearing blocks 55. When the angulated edge 137 of this cam bar strikes follower 133 it forces the follower downwardly pivoting bracket 130 about pin 131. This forces link 128 downwardly, causing shaft 123 to rotate, thereby opening the flap.

The flap opening mechanism is provided with means for insuring that the flaps do not open either on the return movement of the templates or on the forward movement of the template when no pan is disposed over the template.

These latter means include, in addition to the elements described above, a stationary cam 138 mounted on guide rod 56 adjacent to the end of the rod nearest the discharge end of the machine. This cam is adapted to engage the end of bar 136 and shift the bar inwardly, when that bar reaches the end of its stroke, after the rear edge of the template has passed over the greasing station. The action of cam 138 can readily be understood from a consideration of Figure 17. As there shown, cam 138 includes an inwardly angulated face 138a adapted to engage the end of cam bar 136 when the bar reaches the forward end of its stroke. Immediately prior to the end of its stroke cam bar 136 is in a vertical position. However, when the bar engages face 138a it is cammed inwardly, sleeve 139 rotating about bar 56 to the position shown in Figure 17. By the time the bar 136 reaches the end of its forward stroke, it will have passed from engagement with followers 133; and the two flaps will have closed as the followers move upwardly to the position shown in Figure 10. Any suitable form of spring detent is provided for releasably securing the bar in its inner position, the same means also releasably holding the bar in its outer position. Thus bar 136 is temporarily held in its inner position once it is shifted to that position by cam 138; so that as the bar returns toward the forward end of the machine it passes inside of the followers and is ineffective to force them downwardly to open the flaps.

Means are also provided for preventing the flaps from being opened on forward movement of the template when no pan is positioned over the template as for example when the machine is first put into operation. These means include a rotating cam member 140 pivotally secured to leg 18 mounted upon the machine frame. Rotating cam 140 is adapted to be pivoted to one of two positions by means of an actuating rod 141 carried by the forward edge of the template frame. This rod is spring urged outwardly by means of a compression spring 142 so that end 143 of the rod engages the inner surface of rotating cam 140 to hold that cam in its operative position shown in Figure 15. When the cam is so positioned bar 136 is forced outwardly to a position in which it engages followers 133.

Figures 12, 17, 18:
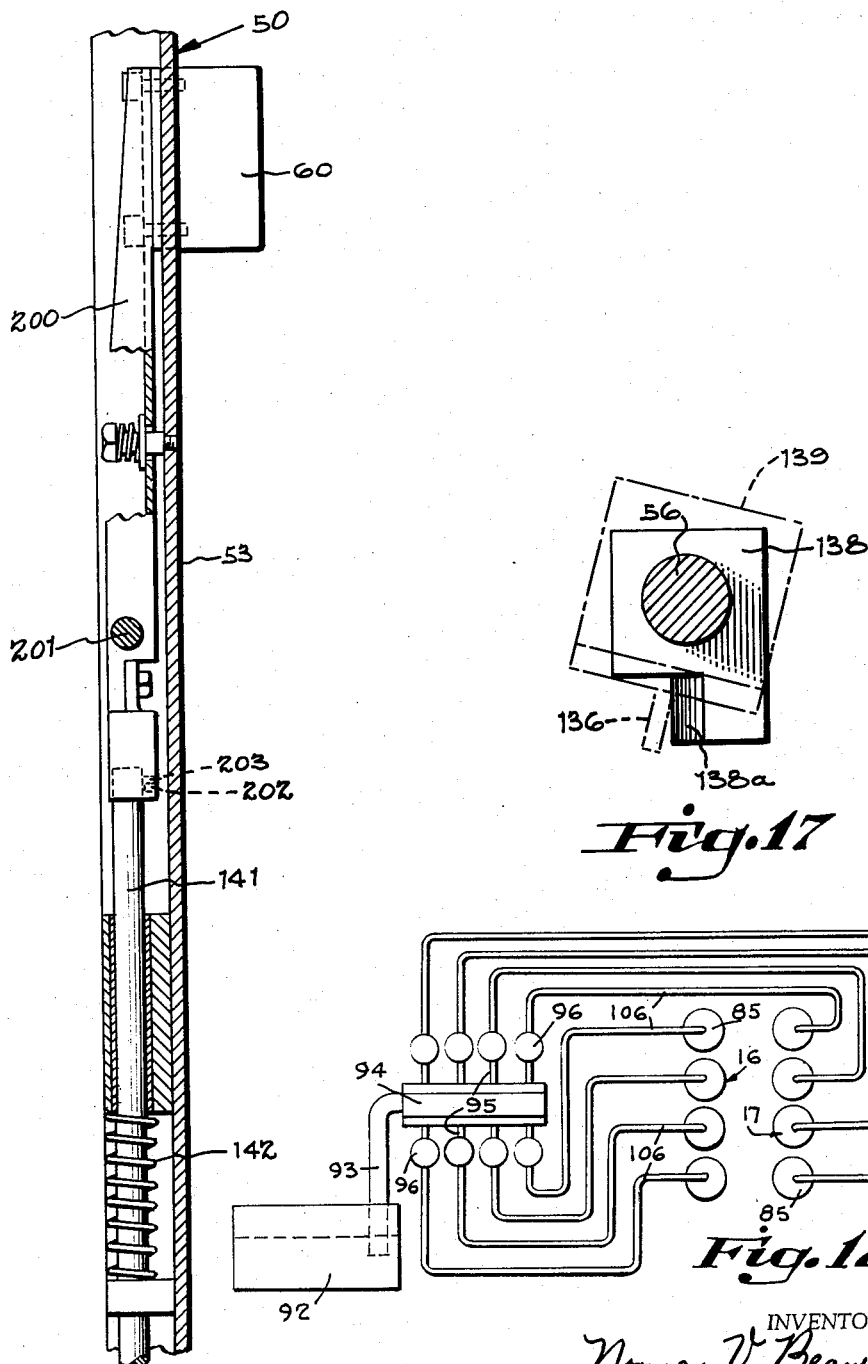
Figure 12 is a diagrammatic view of the grease spraying system.
Figure 17 is a cross-sectional view taken along line 17—17 of Figure 11.
Figure 18 is a cross-sectional view taken along line 18—18 of Figure 15.

A flat spring 144 is disposed in engagement with the inner surface of the cam and urges the cam to rotate in a clockwise direction to a position in which recess 145 is aligned parallel with the side member 54 and is adapted to receive bar 136 when it reaches the forward limit of its movement. Cam 140 is permitted to rotate to this position only when rod 141 is retracted. Retraction of this rod is automatically effected upon return movement of the template frame by the engagement of the rod and face 146 of rotating cam 140. When rod 141 is fully retracted, it engages a rotatable latch member 147, the latch member being mechanically connected to pan advancing lugs 60 in such a manner that the latching member normally engages rod 141 but is rotated to become disengaged from the rod when the lugs are pivoted downwardly by movement under a strap of pans. This particular construction is best shown in Figures 15 and 18. As there shown, pan advancing lugs 60 are carried by one end of a rocker arm 200. This arm is pivotally mounted as at 201. Latch 147 is bolted or otherwise secured to the end of arm 200 remote from pan advancing lug 60. When lug 60 is depressed by engagement with the pan, latch 147 is raised to disengage finger 202 of the latch from a projection 203 formed on the end of rod 141. This frees rod 141 for outward movement under the influence of spring 142.

In operation so long as no pans are placed on the template, cam 140 is rotated under the influence of spring 144 to a position in which bar 136 is received within cam recess 145. The bar thus continues to move in its inner position, out of engagement with the flap actuating followers 133. However, when a pan is in position to be picked up by the template, lugs 60 in their return movement pivot downwardly, as they pass under the strap of pans releasing latch 147 to cause rod 141 to move outwardly. This rod then rotates cam 140 to the position shown in Figure 15 prior to the time cam 140 is engaged by bar 136. Consequently, cam 140 causes bar 136 to be shifted outwardly so that on the forward stroke of the template, the bar engages followers 133 to open the flaps. On the next return movement of the template if no pan is in position, rod 141 strikes face 146 of the rotating cam and is automatically forced inwardly and latched.

Figure 13:
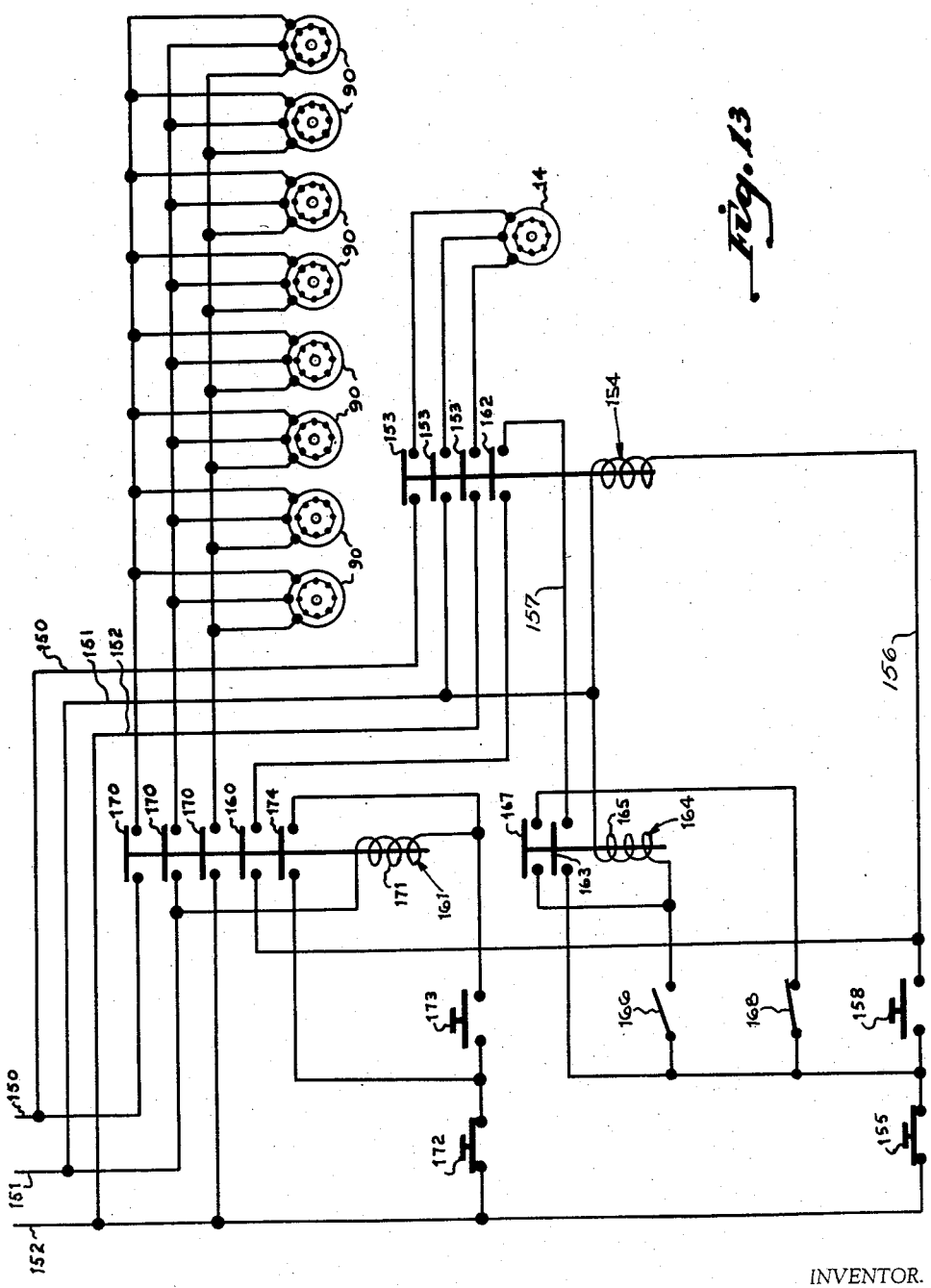
Figure 13 is a schematic circuit diagram of the motor control circuit.

The control circuit for main motor 14 and spray motors 90 is shown in Figure 13. As there shown motor 14 is energized from power lines 150, 151 and 152 through motor contacts 153 of motor relay 154. The coil of motor relay 154 is connected across lines 151 and 152 through normally closed stop switch 155 and parallel lines 156 and 157 respectively including motor start switch 158 and the series combination of interlock contacts 160 of relay 161, hold-in contacts 162 of relay 154, and interlock contacts 163 of cycling relay 164. Coil 165 of cycling relay 164 is connected across lines 151 and 152 through two parallel paths, one including cycling switch 166, the other including hold-in contact 167 of relay 164 and normally closed conveyor positioning switch 168. Spray motors 90 are connected to power lines 150, 151, and 152 through motor contacts 170 of spray motor relay 161. Coil 171 of this relay is connected across lines 151 and 152 through stop switch 172 and the parallel connection of start switch 173 and hold-in contacts 174.

Figure 8:
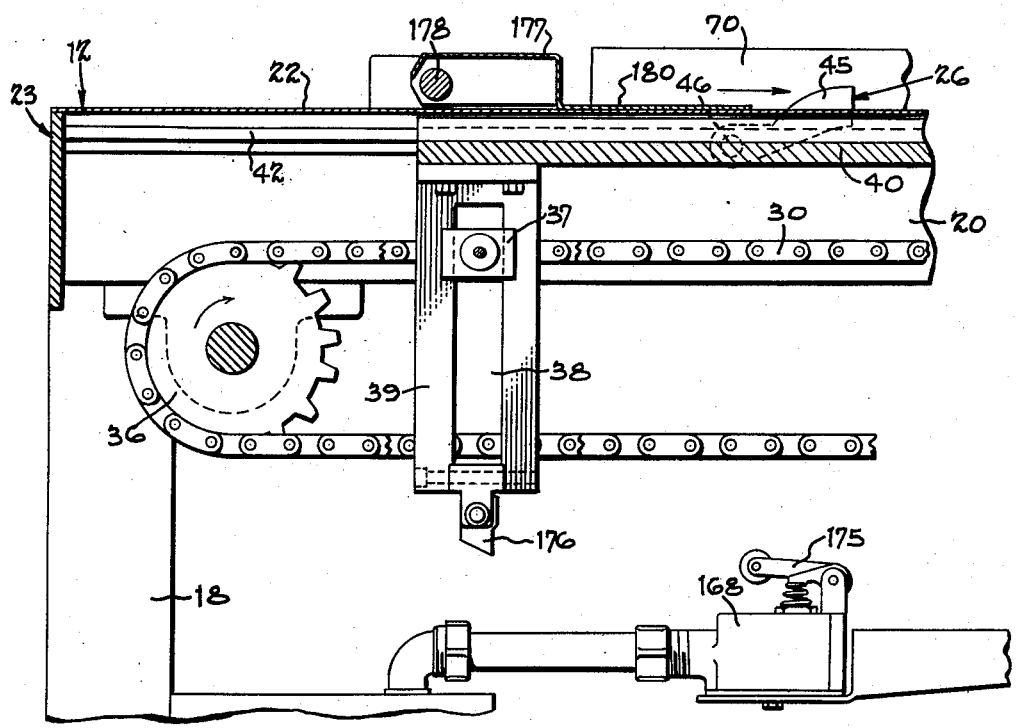
Figure 8 is a cross sectional view taken along line 8—8 of Figure 7.
Figure 9:
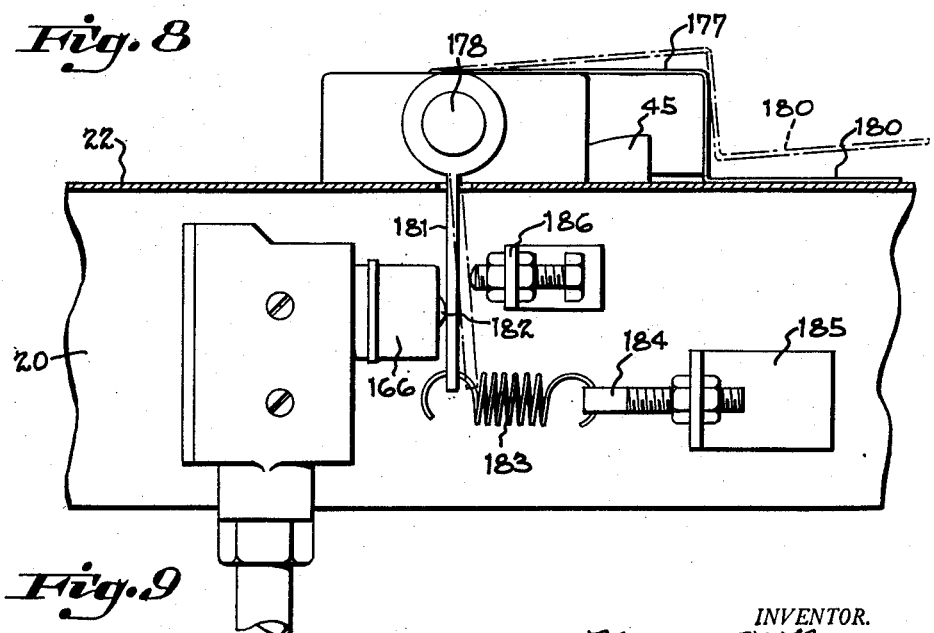
Figure 9 is an enlarged cross sectional view of the pan actuated cycling switch taken along line 9—9 of Figure 7.

Conveyor positioning switch 168 and cycling switch 166 are best shown in Figures 8 and 9. As shown in Figure 8, conveyor positioning switch 168 is a microswitch including an arm 175, spring urged upwardly into the path of a finger 176 carried by driving fork 39. Conveyor positioning switch 168 is preferably disposed from three to six inches from the forward end of the conveyor so that the switch, which is normally closed, is momentarily opened while pan advancing fingers 45 are being retracted toward the forward end of the machine.

Cycling switch 166 is a microswitch adapted to be closed by a flap actuator comprising flap 177 which is pivotally mounted on shaft 178 and includes a lower flange 180 disposed at the loading station and adapted to receive the ends of the pans which are placed between the guide strips on top of the flange. A depending arm 181 is attached to flap 177 and is adapted to actuate plunger 182 of switch 166. In addition, this arm carries a spring 183 which is secured to bolt 184 mounted on bracket 185; this spring is effective to urge the flap upwardly to the dotted position shown in Figure 9, upward movement of the flap being limited by stop 186.

These switches cooperate in the circuit shown in Figure 13 to provide for continued automatic operation of the machine so long as pans are being loaded on flap 177 at the loading station and to automatically stop the machine whenever pan advancing fingers 45 near the end of the return stroke if no pan is at the loading station ready to be advanced. It is extremely important in the present machine that the pan advancing fingers be stopped on their return stroke rather than on their forward stroke. By stopping the pan advancing mechanism while it is moving in the reverse direction, pan advancing fingers 45 always pass under the strap of pans and engage the rear end of the strap so that the pans are properly advanced through the machine and brought into correct alignment with the template at the greasing station. If the machine should be stopped while fingers 45 are moving forward and later a pan should be placed on the loading table, fingers 45 might engage an edge of a pan in the middle of a strap so that the pans would not be advanced through the machine in the proper manner.

The exact functioning of these switches will be apparent from a consideration of Figure 13. In the circuit there shown spray motors 90 are started by pressing spray motor start button 173 which energizes spray motor relay coil 171 closing hold-in contacts 174. Energization of this relay also closes interlocking contacts 160 in the motor relay circuit. The main motor 14 is started by closing motor start switch 158. This momentarily energizes motor relay 154 closing hold-in contacts 162. A pan placed at the loading station in engagement with flap 177 closes cycling switch 166 to energize cycling relay coil 165, thereby closing interlocking contacts 163. Thus motor relay 154 remains energized through the circuit including hold-in contacts 162 and interlocking contacts 160 and 163. Cycling relay 164 also closes hold-in contacts 167 so that the relay remains energized after a pan is shifted from engagement with flap 177 through a circuit including normally closed switch 168 and hold-in contacts 167.

Upon the return stroke of the pan shifting mechanism, if a pan is in the loading position as fingers 45 near the end of their stroke, normally closed switch 168 opens; however, cycling relay coil 165 remains energized through cycling switch 166 so that motor relay 168 remains closed and motor 14 operates continuously.

However, should the operator have failed to place a pan on flap 177, by the time fingers 45 are returned, switch 168 will open deenergizing cycling relay 164 as soon as switch 166 is opened. This causes interlocking contacts 163 to open the deenergizing motor relay 154 and stopping the motor. When desired the motor can be started again by placing a pan on flap 177 and pressing the start switch 173 as explained above.

In operation a strap of pans such as that shown in Figure 14, is placed in an inverted position on the loading platform as shown by dotted lines 187 in Figure 2. The end of the pan strap depresses flap 177 to close cycling switch 166. Spray motor switch 173 is pressed to start the spray motors; starter switch 158 is then closed to complete the circuit to main drive motor 14 as explained above. Conveyor chain 30 is driven from motor 14 through the drive described above. Pan advancing fingers 45 move to the left and pivot downwardly beneath the strap of pans.

As member 37 passes around sprocket 36 and moves driving fork 39 to the right, fingers 45 engage the rear end of the pan strap and thereafter move the pan strap between guides 70 toward greasing station 27. Fingers 45 are effective to shift the pans completely through spring stops 81 before block 37 passes downwardly around the driving pulley to start the return motion of driving fork 39.

In the next cycle of operation, template frame 50 which was shifted toward the discharge end of the machine by its driving engagement with angle bars 44, is retracted along with the angle members 44 and fingers 45. As template frame 50 is retracted and passes beneath the pans, pivoted lugs 60 are pivoted downwardly.

As these lugs are shifted past the end of the pans they spring upwardly so that when the driving fork is again shifted forwardly, moving the template frame along with it, the lugs engage the pans to accurately bring them into registry with the template openings. Thereafter, the lugs are effective to shift the strap of pans along with the template through the greasing station. As the template starts through the greasing station, bar 136 engages the first of the roller followers 133, pushing that follower downwardly to open flap 116 as explained above. A curtain of grease is thrown from the forward set of discs 16 upwardly through the apertures of the template into the cavities of the baking pans. As the pans are advanced further, cam bar 136 engages the second follower to open the second flap so that an additional curtain of grease is projected into the pan openings from discs 17 to thoroughly grease the bottom and side and end walls of the baking cavities. Each flap is closed before the template passes over the flap opening by the disengagement of bar 136 from the associated follower 133. As the template nears the end of its forward stroke, the strap of pans is pushed through the second set of stops 81 and comes to rest over draining station 28. Any excess grease on the pan greasing template drips onto wall extension 120 from which it is returned to the sump. Also, as the template reaches the end of its stroke bar 136 engages fixed cam 138 so that the bar is shifted inwardly to an inner position in which it is held by the spring detent (not shown).

As the template frame is returned, bar 136 is disposed inwardly of followers 133, so that the flaps remain closed and no grease is sprayed into the room. At the return end of the template stroke, rod 141 strikes cam 140 which forces the rod inwardly where it is held by latch member 147. However, if a strap of pans is waiting at stops 81, lugs 60 pass under the strap of pans previously deposited by fingers 45 at stops 81 and release actuating rod 141 thereby rotating cam 140 and forcing bar 136 outwardly into a position in which it is adapted to actuate the flaps on the next forward stroke of the template. If no pans are positioned at stops 80, rod 141 remains latched and bar 136 remains in its inner position.

At draining station 28, pan advancing fingers 67 are reciprocated in unison with template frame 50. On the return stroke of the pan shifting mechanism, these fingers pass under the strap of pans deposited at stops 81 during the previous advancement of the template. After passing the pans, these fingers spring upwardly engaging the rear wall of the strap of pans to shift the pans from the draining station onto the unloading table 13 from which the pans are manually removed by an operator.

It will be appreciated that when the greasing machine is in operation, the above outlined operations are performed simultaneously. That is, while one set of pans is being shifted from the loading station to the greasing station, another set of pans is being shifted across the greasing station. At the same time, a third set of pans is being moved from the draining station to the unloading table and an operator is removing the fourth strap of pans from the unloading table.

From the foregoing discussion of the general principles of the present invention and the above detailed description of a preferred embodiment, those skilled in the art will readily comprehend various modifications of which the invention is susceptible. For example, a modified form of nozzle construction is shown in Figure 16. The advantage of the modified nozzle there shown is that it minimizes the interference with the spray thrown tangentially from adjacent discs. As shown in Figure 16 the modified nozzle 190 comprises a tubular arm 191 terminating in an inwardly facing grease opening 192 positioned at the center of and adjacent to grease spinning disc 85. Tubular member 191 extends radially of the disc in close proximity thereto and is attached to a grease supply tube 193 connected to the output line of a positive displacement pump. The nozzle is held in place by means of a bracket element 194 including a rod 195 spaced an appreciable distance from tube 191 and in engagement with clamping member 196 which in turn fits in a radial hollow arm 108 mounted on a transverse rod 112. As shown in Figure 16 the plane of the adjacent disc 85a coincides with the opening between tube 191 and rod 195 so that no appreciable interference is caused in that portion of the spray projected by disc 85a which is aimed at the pan cavities.

Having described my invention, I claim:

1. A machine for greasing baking pans in an inverted position, said machine comprising a pan loading table, a pan discharge table, a greasing station and a draining station disposed intermediate the loading table and discharge table, means effective to engage pans placed on said loading table and to advance pans in a step by step movement from said loading table to said discharge table, a template mounted for reciprocating movement over said greasing station and adapted to receive the inverted pans; said template being provided with a plurality of apertures adapted for registry with cavities in said pans, a plurality of rotating flinging members disposed beneath said template at said greasing station and adapted to project grease by centrifugal force upwardly into the pan cavities.

2. A machine for greasing baking pans in an inverted position, said machine comprising a pan loading table, a discharge table, a greasing station and a draining station disposed intermediate the loading station and discharge station, means adapted to engage pans placed upon said loading table and to advance said pans in a step by step movement from said loading station to said discharge station, a template adapted for reciprocating movement over said greasing station and adapted to receive the inverted pans; said template being provided with a plurality of apertures adapted for registry with cavities in said pans, two sets of rotating flinging members disposed beneath said template at said greasing station and adapted to project grease upwardly by centrifugal force into the pan cavities, each of said sets of rotating flinging members comprising a plurality of overlapping members disposed for rotation in parallel planes, the planes of rotation of one set of members being angulated relative to the other set.

3. A machine for greasing baking pans in an inverted position, said machine comprising a pan loading table, a discharge table, a greasing station and a draining station disposed intermediate the loading station and discharge station, means for engaging pans placed upon said loading table and advancing pans in a step by step movement from said loading station to said discharge station, a template adapted for reciprocating movement over said greasing station and adapted to receive the inverted pans; said template being provided with a plurality of apertures adapted for registry with cavities in said pans, two sets of rotating flinging members disposed beneath said template at said greasing station and adapted to project grease by centrifugal force upwardly into the pan cavities, each of said sets of rotating flinging members comprising a plurality of overlapping members disposed for rotation in parallel planes, the planes of rotation of one set of members being angulated relative to the other set, the planes of rotation of each set of rotating members also being angulated relative to the template, the upper ends of said rotating members sloping toward the members of the opposite set.

4. A pan greasing machine comprising a plurality of rotating discs, means for supplying grease to said discs, said discs being effective to project said grease upwardly in a spray, a template mounted for reciprocating movement over said discs, said template being adapted to receive a plurality of inverted baking pans, means for confining spray from said discs when the template is not disposed over said discs, said means comprising a flap disposed above said discs and cam means including an element moveable with said template, the cam means being effective to rotate said flap when the template is disposed in the path of grease projected from said discs.

5. A pan greasing machine comprising a base supporting a plurality of rotating discs, means for supplying grease to said discs, a template mounted for reciprocating movement over said discs, and means for confining spray from said discs when the template is not disposed over said discs, said means comprising a flap disposed above said discs, and cam means including a member movable with said template, and a follower mounted upon said base and adapted to be shifted by engagement with said member to rotate said flap, cam means for shifting said member to a position spaced from said follower when the template reaches the end of its forward stroke.

6. A pan greasing machine comprising a base supporting a plurality of rotating discs, means for supplying grease to said discs, a template mounted for reciprocating movement over said discs, and means for confining spray from said discs when the template is not disposed over said discs, said means comprising a flap disposed above said discs, and cam means including a member movable with said template, and a follower mounted upon said base and adapted to be shifted by engagement with said member to rotate said flap, cam means for shifting said member to a position spaced from said follower when the template reaches the end of its forward stroke, and means responsive to the presence of pans on said template for returning said member to a position for engagement with said follower when pans are disposed over said template.

7. A pan greasing machine comprising a loading station, a greasing station, a draining station, and a discharge station, means for advancing straps of pans in an inverted position from said loading station to said discharge station, said means comprising a longitudinally extending chain, a first plurality of longitudinally extending members, a drive fork connected to said chain and connected to said longitudinally extending members, a template carrying frame secured to the ends of said members and adapted for reciprocating movement over said greasing station, a second plurality of longitudinally extending members secured to the opposite end of said template and extending outwardly from said template in the direction of said discharge station, an upwardly extending pan advancing finger pivotally secured to one of said first named members, a second upwardly extending pan advancing fingers pivotally secured to said second named members, an upwardly extending pan advancing lug pivotally secured to said template carrying frame, each of said fingers and lug being adapted to engage the rear edge of a group of pans for advancing the pans, a first spring urged stop member disposed intermediate the loading station and the greasing station, a second spring urged stop member disposed between the greasing station and draining station, said stop members being effective to prevent rearward movement of the pans after they have been advanced by the pan advancing members.

8. A pan greasing machine comprising a loading table, a greasing station and a discharge station, means for advancing pans from said loading table to said greasing station and from said greasing station to said discharge station, said means comprising an electric motor, a plurality of pan advancing fingers adapted to engage the rear edge of said pans, means interconnecting said motor and said fingers for reciprocating said fingers, and electrical circuit means for de-energizing the motor when no pan has been placed on the loading table and the fingers reach a predetermined point in their return movement toward the loading station.

9. A pan greasing machine comprising a loading table, a greasing station and a discharge station, means for advancing pans from said loading table to said greasing station and from said greasing station to said discharge station, said means comprising an electric motor, a plurality of pan advancing fingers adapted to engage the rear edge of said pans, means interconnecting said motor and said fingers for reciprocating said fingers, and a motor energization circuit including contacts for de-energizing the motor when no pan has been placed on the loading table and the fingers reach a predetermined point in their return movement toward the loading station, said circuit means comprising a cycling switch adapted to be closed by a pan positioned on said able, a second normally closed switch adapted to be opened momentarily when said fingers reach a predetermined point on their return movement, and a relay coil for actuating the said contacts in said motor energization, said first and second switches being in parallel circuit relationship with each other and series relationship with said relay coil, whereby said relay coil is de-energized to open said contacts when said cycling switch and said second switch are open simultaneously.

10. A pan greasing machine for greasing inverted pans, said machine comprising a template adapted to receive inverted pans, means for advancing said template and pans in unison, two sets of rotating spray discs adapted to project grease through said template into said pans and means for supplying grease to said spray discs, said spray discs of each set being mounted in parallel planes, the planes of one set of discs being angulated with respect to the planes of the other discs, said planes being spaced from one another along the surface of the pan.

11. A pan greasing machine comprising a base supporting a plurality of rotating discs, means for supplying grease to said discs, a template mounted for reciprocating movement over said discs, and means for confining spray from said discs when the template is not disposed over said discs, said means comprising a flap disposed above said discs, and cam means including a member movable with said template, and a follower mounted upon said base and adapted to be shifted by engagement with said member to rotate said flap, cam means for shifting said member to a position spaced from said follower when the template reaches the end of its forward stroke, and means responsive to the presence of pans on said template for returning said member to a position for engagement with said follower when pans are disposed over said template, said last named means comprising a rotary cam, said cam having a recess adapted to receive said member when the rotary cam is in a first position and a camming surface adapted to shift the member when the rotary cam is in a second position, an actuating rod for positioning said rotary cam, said actuating rod being movable with said template and being spring urged to a position effective to move said rotary cam to its second named position, latching means for maintaining said rod out of engagement with said rotary cam, and fingers movable with said template and mounted for pivotal movement by a pan disposed on said template to release said latching means.

References Cited in the file of this patent

UNITED STATES PATENTS

| | | |
|---|---|---|
| 1,686,968 | Harber | Oct. 9, 1928 |
| 2,159,400 | Preston | May 23, 1939 |
| 2,350,708 | Roselund | June 6, 1944 |
| 2,542,623 | Cohen | Feb. 20, 1951 |
| 2,576,638 | Peeps | Nov. 27, 1951 |
| 2,633,820 | Koerber | Apr. 7, 1953 |
| 2,643,636 | Bauer | June 30, 1953 |
| 2,734,479 | Norris | Feb. 14, 1956 |